(12) United States Patent
Mosseri et al.

(10) Patent No.: US 11,663,266 B2
(45) Date of Patent: May 30, 2023

(54) SIMILARITY SEARCH ENGINE FOR A DIGITAL VISUAL OBJECT

(71) Applicant: ISRAEL ATOMIC ENERGY COMMISSION NUCLEAR RESEARCH CENTER—NEGEV, Beer Sheva (IL)

(72) Inventors: Idan Mosseri, Tel Aviv (IL); Matan Rusanovsky, Modi'in (IL); Gal Oren, Lehavim (IL)

(73) Assignee: ISRAEL ATOMIC ENERGY COMMISSION NUCLEAR RESEARCH CENTER—NEGEV, Beer Sheva (IL)

( * ) Notice: Subject to any disclaimer, the term of this patent is extended or adjusted under 35 U.S.C. 154(b) by 0 days.

(21) Appl. No.: 17/282,574

(22) PCT Filed: Oct. 7, 2019

(86) PCT No.: PCT/IL2019/051100
§ 371 (c)(1),
(2) Date: Apr. 2, 2021

(87) PCT Pub. No.: WO2020/075166
PCT Pub. Date: Apr. 16, 2020

(65) Prior Publication Data
US 2021/0342386 A1    Nov. 4, 2021

(30) Foreign Application Priority Data

Oct. 8, 2018  (IL) .......................................... 262220

(51) Int. Cl.
*G06F 16/532* (2019.01)
*G06F 16/538* (2019.01)
(Continued)

(52) U.S. Cl.
CPC .......... *G06F 16/583* (2019.01); *G06F 16/532* (2019.01); *G06F 16/538* (2019.01);
(Continued)

(58) Field of Classification Search
CPC .. G06F 16/532; G06F 16/583; G06F 16/5866; G06F 16/538; G06K 9/6253; G06K 9/6215
See application file for complete search history.

(56) References Cited

U.S. PATENT DOCUMENTS

2009/0254540 A1* 10/2009 Musgrove ............... G06F 16/31
707/999.005
2010/0046842 A1    2/2010 Conwell
(Continued)

OTHER PUBLICATIONS

International Application No. PCT/IL2019/051100, International Search Report and Written Opinion, dated Dec. 30, 2019.
(Continued)

*Primary Examiner* — Angelica Ruiz
(74) *Attorney, Agent, or Firm* — Marshall, Gerstein & Borun LLP (57) ABSTRACT

The present invention provides a similarity search engine for a digital visual object (i.e., a digital image that represents a design, graphics, logo, symbols, words, or any combination thereof). The similarity search engine is based on a method that consists of conducting several independent search queries, thus each query examining a different aspect of similarity.

8 Claims, 5 Drawing Sheets

(51) Int. Cl.
  *G06F 16/58* (2019.01)
  *G06K 9/62* (2022.01)
  *G06F 16/583* (2019.01)
  *G06F 18/22* (2023.01)
  *G06F 18/40* (2023.01)
  *G06V 30/19* (2022.01)
  *G06V 10/74* (2022.01)

(52) U.S. Cl.
  CPC .......... *G06F 16/5866* (2019.01); *G06F 18/22* (2023.01); *G06F 18/40* (2023.01); *G06V 10/761* (2022.01); *G06V 30/19133* (2022.01)

(56) References Cited

U.S. PATENT DOCUMENTS

| | | | |
|---|---|---|---|
| 2011/0047166 A1* | 2/2011 | Stading | G06F 16/332 |
| | | | 707/E17.109 |
| 2015/0324469 A1 | 11/2015 | Keyngnaert et al. | |
| 2016/0196350 A1 | 7/2016 | Mau | |
| 2016/0350336 A1* | 12/2016 | Checka | G06V 10/764 |

OTHER PUBLICATIONS

Extended European Search Report issued in European Application No. 19871838.9, dated Jun. 7, 2022.

\* cited by examiner

SIMILARITY SEARCH ENGINE FOR A DIGITAL VISUAL OBJECT

FIELD OF THE INVENTION

The present invention relates to the field of similarity search engines. More particularly, the invention relates to a method of searching for similarity between any pair of digital visual objects.

BACKGROUND OF THE INVENTION

The main function of patent offices is to provide legal protection of industrial intellectual properties through the registration of patents, designs and trademarks. Granting a right to intellectual properties depends on an examination of a specific application. An examination is essential to ensure the exclusivity for said property.

In particular, the current examination process for trademarks is done manually and slowly, using human trademark examiners—who are required to conduct a massive search in a large unordered database, while deciding whether there is any similarity between the trademark submitted via an application and the already approved marks.

The existing manual examination is done in the following manner: each approved trademark in the database is manually classified with a sub-group of tags/attributes from the Vienna Classification (VCL) tag set (i.e., classifying figurative elements of marks into categories, divisions and sections, on the basis of their shape), upon its approval. When given a new trademark to examine, the trademark examiner first manually classifies this trademark with a subset of tags/attributes from the Vienna Classification set. Then, the trademark examiner conducts a manual visual search through all approved trademarks classified with the same tag/attribute, in search for similar trademarks. Therefore, an improvement in computer tools (in particular a computer based similarity search engine) that may save trademark examiners effort or time or otherwise improve their performance is required.

Additionally, since the existing examination process requires experienced examiners, applicants cannot perform an initial search by themselves. A search done previously to the registration process could indicate to the applicant that there is a similar trademark which had already been approved. Therefore, making a similarity search engine accessible also to the public, might save unnecessary trademark registration requests, thus, saving time and money.

It is an object of the present invention to provide a system which is capable of providing similarity search engine for a digital representation of a visual object.

Other objects and advantages of the invention will become apparent as the description proceeds.

SUMMARY OF THE INVENTION

The present invention relates to a method of searching for similarity between digital visual objects, comprising:
  a) receiving an image of a digital visual object to be examined;
  b) applying similarity search on the received image by using one or more of the following similarities aspects: automated tags similarity, image/pixel similarity, text similarity and manual tags similarity;
  c) extracting from at least one database stored images of digital visual objects according to said applied similarity search;
  d) ordering the extracted images according to each similarity aspect; and
  e) displaying the ordered images of each aspect in a different section.

According to an embodiment of the invention, the automated tags similarity relates to digital visual objects that have similar main features.

According to an embodiment of the invention, the image/pixel similarity is configured for catching structural similarities of the digital visual objects.

According to an embodiment of the invention, the text similarity configured to order images by the similarity of the text they may contain, to the text in the received image.

According to an embodiment of the invention, the manual tags similarity is configured to allow a user to manually classify a digital image of a visual object with desired tags.

According to an embodiment of the invention, digital visual objects are images of trademarks.

In another aspect, the present invention relates to a system of searching for similarity between digital visual objects, comprising:
  a) at least one processor; and
  b) a memory comprising computer-readable instructions which when executed by the at least one processor causes the processor to execute similarity search engine, wherein the similarity search engine:
    I. receives an image of a digital visual object to be examined;
    II. applies similarity search on the received image by using one or more of the following similarities aspects: automated tags similarity, image/pixel similarity, text similarity and manual tags similarity;
    III. extracts from at least one database stored images of digital visual objects according to said applied similarity search;
    IV. orders the extracted images according to each similarity aspect; and
    V. displays the ordered images of each aspect in a different section.

A non-transitory computer-readable medium comprising instructions which when executed by at least one processor causes the processor to perform the method of the present invention.

DETAILED DESCRIPTION OF THE INVENTION

Various terms are used throughout the description and the claims which should have conventional meanings to those with a pertinent understanding of computer programming.

Additionally, various descriptive terms are used in describing the exemplary embodiments in order to facilitate an explanation of them, and to aid one's understanding. However, while the description to follow may entail terminology which is perhaps tailored to certain computing or programming environments, such as operating system designed to operate within cloud computing or virtualization environments, it will be appreciated by a person skilled in the art that such terminology is employed in a descriptive sense and not a limiting sense. Where a confined meaning of a term is intended, it will be explicitly set forth or otherwise apparent from the disclosure.

Reference will now be made to several embodiments of the present invention, examples of which are illustrated in the accompanying figures for purposes of illustration only. One skilled in the art will readily recognize from the following description that alternative embodiments of the methods illustrated herein may be employed without departing from the principles of the claimed invention.

The present invention provides a similarity search engine for a digital visual object (i.e., a digital image that represents a design, graphics, logo, symbols, words, or any combination thereof). The similarity search engine is based on a method that consists of conducting several independent search queries, thus each query examining a different aspect of similarity (i.e., a range of similarity aspects).

Figure 1A:
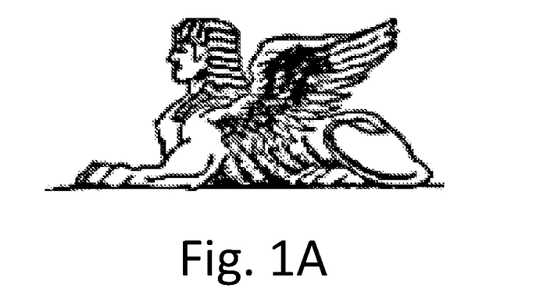
FIGS. 1A and 1B show image/pixel similarity between two images of digital visual objects.
Figure 1B:
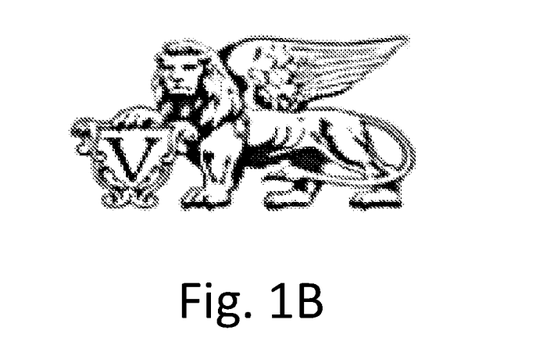

According to an embodiment of the invention, the aspects of similarity may involve one or more of the following search queries which will be described in further details hereinafter:

1. Automated tags similarity—This similarity aspect relates to digital visual objects (e.g., digital images of trademarks) that have similar main features. For example, trademarks that contain dogs will probably be tagged with the tag "dog", thus, will be considered similar in some sense.
2. Image/pixel similarity—This similarity aspect is responsible for catching structural similarities of the images. For example, according to such similarity aspect, the images shown in FIGS. 1A and 1B may be considered similar by the system.
3. Text similarity—This similarity aspect orders images (e.g., approved trademarks) by the similarity of the text they may contain, to the text in a digital visual object (e.g., a new trademark being examined).
4. Manual tags similarity—This similarity aspect allows a user to manually classify a digital image of a visual object (e.g., an image of a trademark) with desired tags (e.g., in case of a trademark the desired tags can be taken from the Vienna Classification system), and then to go through all other images (e.g., approved trademarks) that had already been classified with the same tags.

Figure 2:
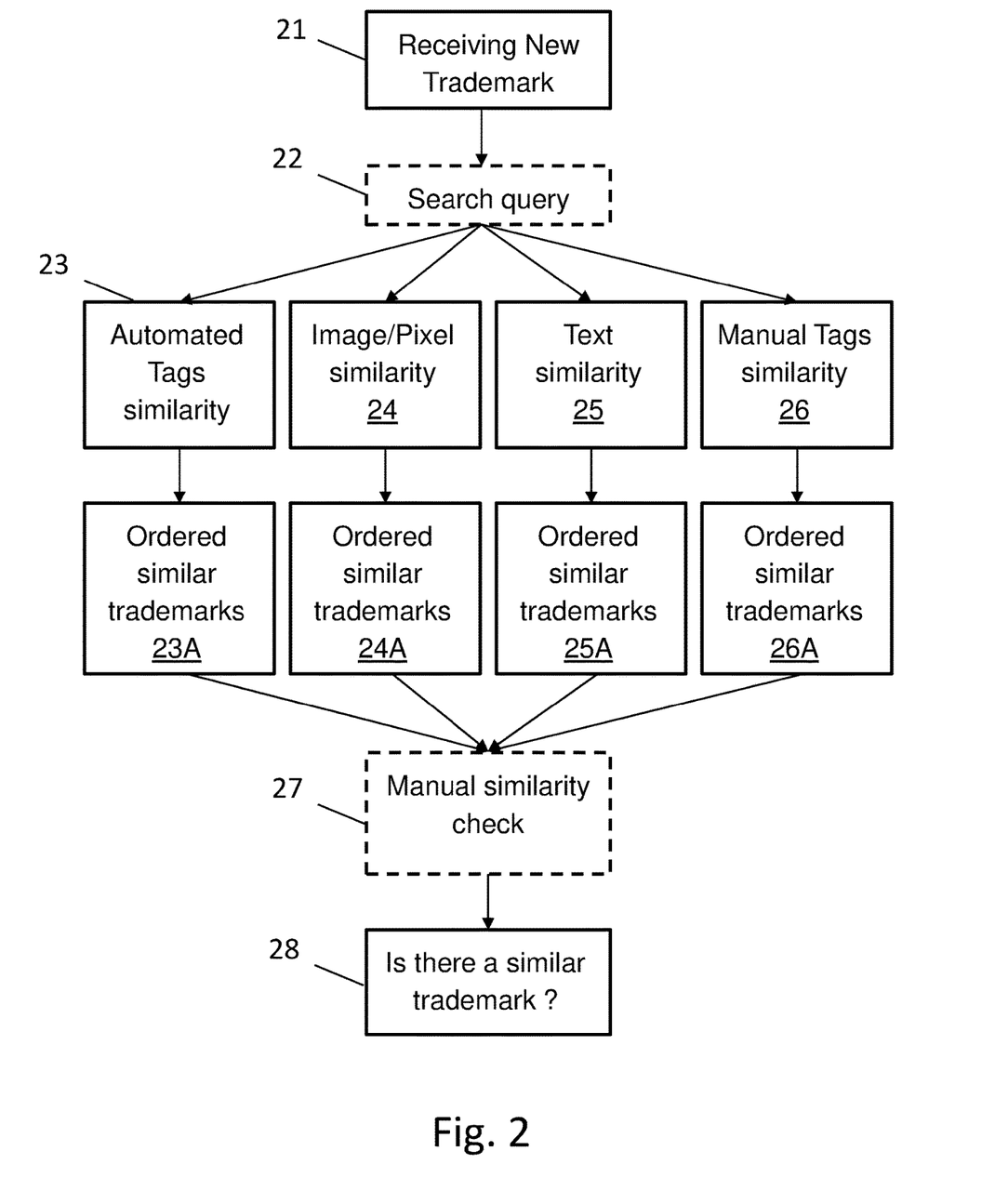
FIG. 2 is a flow chart generally illustrating the search operation method, according to an embodiment of the invention.

Referring now to FIG. 2, according to an embodiment of the invention, the system may work in the following manner:
receiving an image representing a digital visual object (e.g., an image representing a trademark, bloc 21). For example, the image can be received via a website that is adapted to communicate via a data network with the similarity search engine that is located in a cloud computing environment (e.g., a webpage dedicated to perform a trademark search through which a user can upload the desired image to the cloud (i.e., provide the image to the search engine), and the similarity search engine base its search upon the received image);
performing a search query (bloc 22) for each one of the above four aspects (blocs 23-26) and accordingly displaying four independent output sections (blocs 23a-26a), corresponding to the four aspects mentioned above. For example, in case of a website that is adapted to conduct a trademark search, in each of these four independent output sections, the most similar trademarks are presented in the order of their similarity to the input image (e.g., to the provided trademark); and upon displaying the outputs (e.g., on the webpage), a user may easily decide whether a similar trademark exists (blocs 27-28).

As will be further explained hereinafter a trademark search made employing the above four aspects may yield the best results and, therefore, this one is a preferred method to carry out the invention, although of course less precise results can be obtained while using less aspects. Furthermore, alternative aspects or comparable to these four aspects can be employed, all of which is encompassed by the invention. For the sake of brevity, however, the process of trademark search that was found to yield the best results and examples will be described hereinafter.

Although the similarity search engine of the present invention may help to facilitate the trademarks examination process, it will be appreciated by a person skilled in the art, that such similarity search engine can be applied mutatis mutandis to other image based searches. In particular automation of trademarks examination process using Artificial Intelligence with the supervision of trademark examiners can provide a solution for searching for similar trademarks with more ease and higher accuracy. This is due to the benefits of examining the trademarks ordered by a range of similarity aspects. Using this separation, one can focus on the best results from each category rather than searching through an unorderly mixture of them.

Another benefit of having the trademarks ordered by different similarity aspects, is the preservation of the current method—one of manual tags similarity. Thus, not harming the existing work process of the trademark examiners.

The first similarity aspect, automated tags similarity, may use machine learning models (e.g., such as Google Vision API technology that enables to derive insight from images with Google's pre-trained API models or easily train custom vision models with AutoML Vision). Automated tags similarity may work as follows:
extracting image attributes and their content as tags from a received digital image (e.g., an image that represent a trademark), together with the already approved trademarks from the database; and
comparing the tags of the received trademark with the ones of the already approved trademarks, and displaying them ordered by similarity score.

The second aspect, image/pixel similarity, may use Artificial Intelligence (AI) models, such as computer vision AI platform provided by Clarifai's technology, in order to find visual similarities between images. It uses Image Processing techniques to display trademarks ordered by similarity to the input trademark. As aforementioned, this aspect is responsible for catching structural similarities of the images.

The third aspect, text similarity, orders approved trademarks by the similarity of the text they may contain, to the text in the new trademark being examined. To quantify such text similarity, algorithms such as Dice's Coefficient, Levenshtein distance, Jaccard Similarity or Cosine Similarity can be used. For example, the Dice's Coefficient algorithm returns a fraction between "0" and "1", which indicates the degree of similarity between the two strings (e.g., a first string refer to text that may appear in the examined trademark and the second string refers to the text that appear in each relevant approved trademark). Wherein "0" indicates completely different strings, "1" indicates identical strings.

The comparison is case-insensitive. For instance, it is found that the score given by Dice's Coefficient algorithm to the string pair "healed" and "sealed" is 0.8, and for the string pair "Olive-green table for sale, in extremely good condition." and "For sale: table in very good condition, olive green in colour." is 0.71, which indicate strong resemblance. While the score of the string pair "Olive-green table for sale, in extremely good condition." and "Wanted: mountain bike with at least 21 gears." is only 0.11 which indicates low resemblance.

The fourth aspect, manual tags similarity, is the same as the existing examination trademark method. Namely, it allows a user (e.g., a trademark examiner) to manually classify the trademark with the desired tags from the Vienna Classification (VCL) system, and then to go through all other trademarks that had already been approved and classified with the same tags. This method only reduces the amount of trademarks to examine, rather than the previous methods that present the trademarks in an ordered fashion. Thus, allowing the examiner to focus only on the most similar trademarks, and then to decide whether there is an already approved trademark that is similar to the input trademark.

Figure 3:
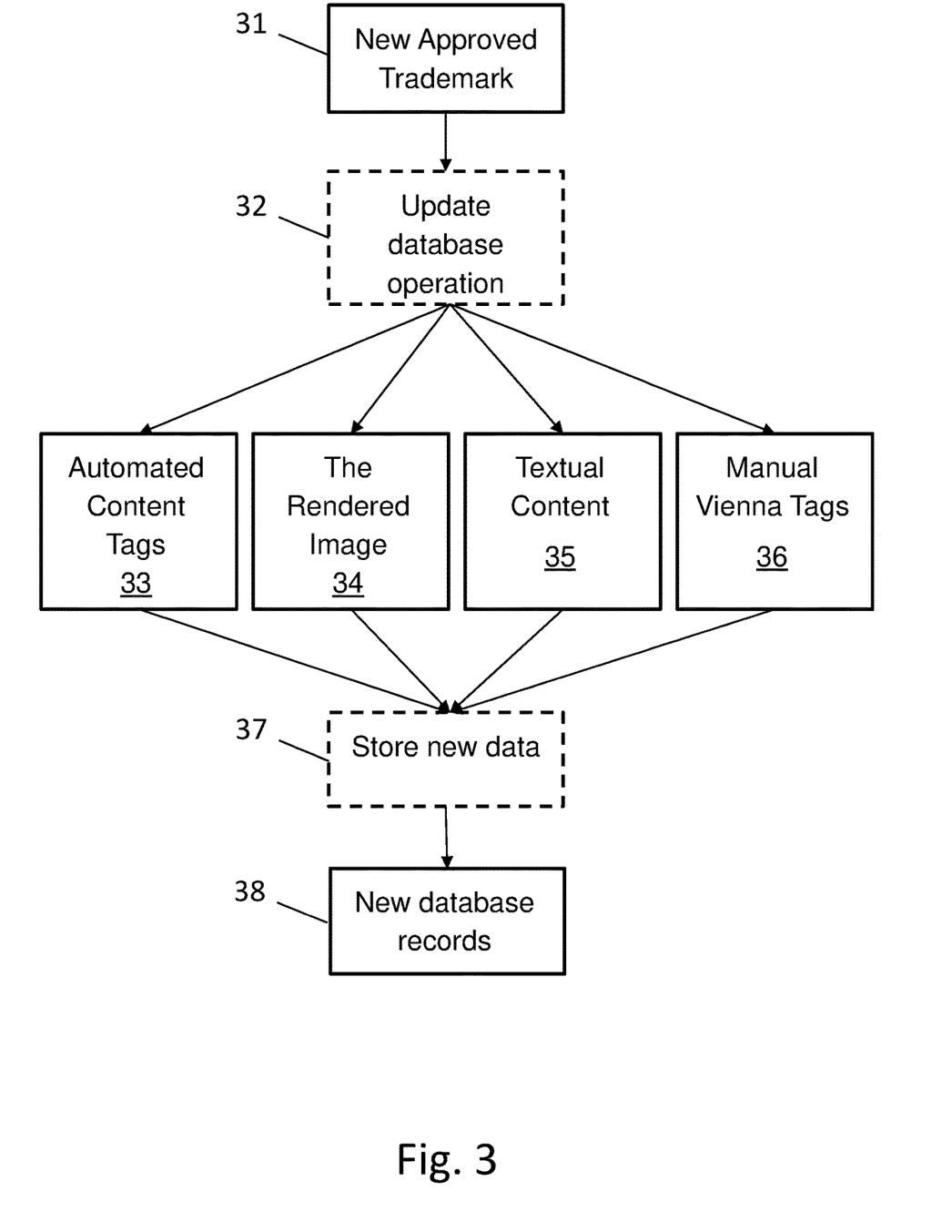
FIG. 3 is a flow chart that generally demonstrates how the system deals with database maintenance after each new trademark approval, according to an embodiment of the invention.

FIG. 3 demonstrates how the system of the present invention deals with database maintenance after each new trademark approval in order to allow examining similarities of future new trademarks to the just approved trademark. In general, the system saves the data corresponding to each similarity aspect in the database, thus the data maintenance may involve the following steps:
- receiving new approved trademark (bloc 31);
- updating database operation (bloc 32) according to each of the above similarities aspects (blocs 33-36);
- storing new data (bloc 37); and
- adding new database records.

The following discussion is intended to provide a brief, general description of a suitable computing environment in which the similarity search engine of the present invention may be implemented. While the invention can be described in the general context of program modules or codes that execute in conjunction with an application program that runs on an operating system on a cloud-based computer system, those skilled in the art will recognize that the invention may also be implemented in combination with other program modules and computer systems. The functions of the similarity aspects described hereinabove may be performed by executable code and instructions stored in computer readable medium and running on one or more processor-based systems. Embodiments of the invention may be implemented as a computer process, e.g., a computer system that encodes a computer program of instructions for executing the computer process. A user (e.g., a trademark examiner) may access the similarity search engine via a dedicated website or a software/mobile application that is programed to communicate with the search engine.

All the above will be better understood through the following illustrative and non-limitative examples.

The workflow of the system consists of the following steps:
- From a main page of a website dedicated to trademark search, an "examine trademark" button is selected to upload/input an image of a trademark to be examined;
- Upon uploading the trademark's image, the user may select one or more of the four similarities aspects; and
- The ordered trademarks may be examined, in order to determine whether there is a similar trademark that had already been approved, to the input trademark.

Figure 5:
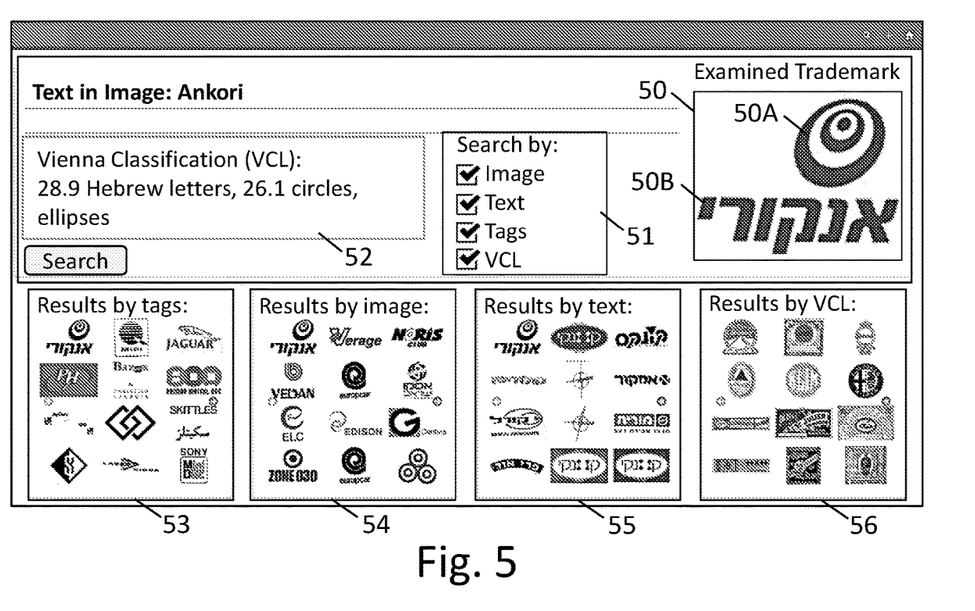
Figure 6:
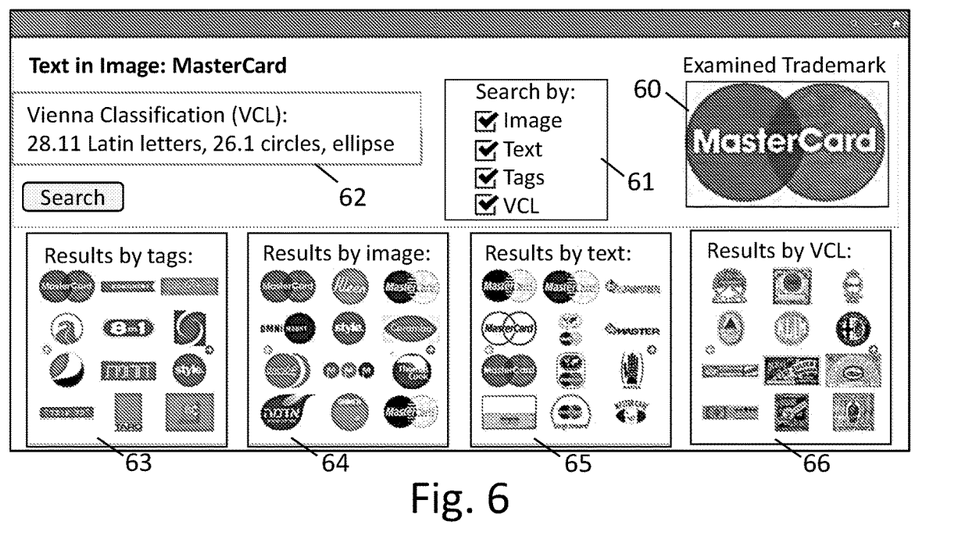
Figure 7:
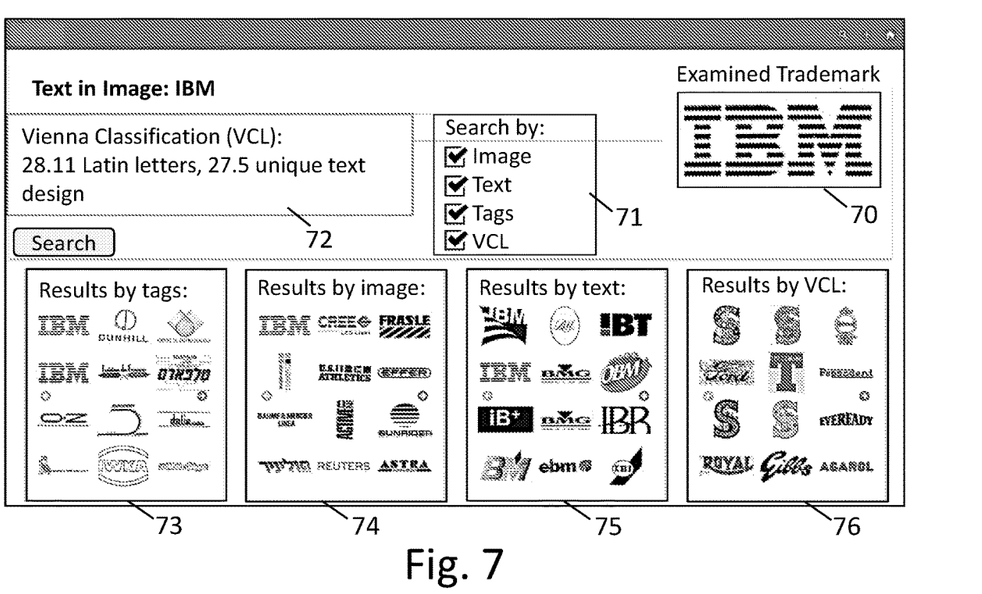

FIGS. 4-7 show several examples of search results that obtained from different categories: Trademark without text (FIG. 4), Trademark with separated text (FIG. 5), Trademark with integrated text (FIG. 6), and Text trademark (FIG. 7). In each of these categories, another similarity aspect might shine and display better results. Therefore, the use of the four similarity aspects is preferred.

Figure 4:
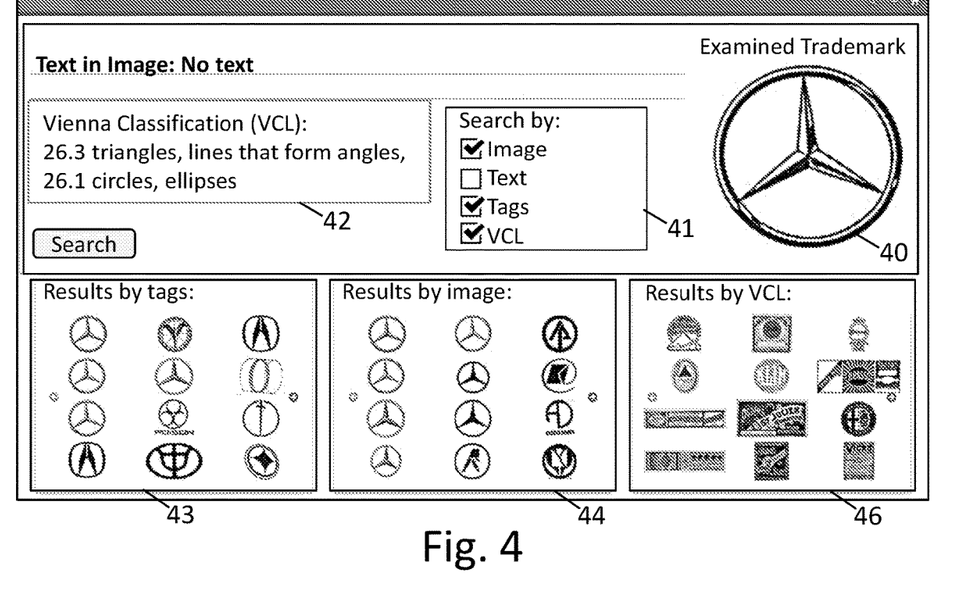
FIGS. 4-7 show several examples of search results that obtained from the system of the present invention.

FIG. 4 shows a search conducted for a Mercedes-Benz sign 40 which is used herein as an example for a trademark that does not include text. As indicated by numeral 41, the search is limited only to image, tags and VCL (i.e., the text category is not selected). The VCL description is indicated by numeral 42 and the search results by each category are indicated as follows: results by tags 43, results by image 44 and results by VCL 46.

FIG. 5 shows a search conducted for an "Ankori" sign 50 (a symbol of an Israeli education network) which is used herein as an example for a trademark that includes a symbol 50A and text in Hebrew letters 50B that are provided in a separate form. As indicated by numeral 51, the search includes image, text, tags and VCL (i.e., all categories are selected). The VCL description is indicated by numeral 52 and the search results by each category are indicated as follows: results by tags 53, results by image 54, results by text 55 and results by VCL 56.

FIG. 6 shows a search conducted for a Master Card sign 60 which is used herein as an example for a trademark in which the graphic and text are integrated. As indicated by numeral 61, the search includes image, text, tags and VCL (i.e., all categories are selected). The VCL description is indicated by numeral 62 and the search results by each category are indicated as follows: results by tags 63, results by image 64, results by text 65 and results by VCL 66.

FIG. 7 shows a search conducted for an IBM sign 70 which is used herein as an example for a text trademark. As indicated by numeral 71, the search includes image, text, tags and VCL (i.e., all categories are selected). The VCL description is indicated by numeral 72 and the search results by each category are indicated as follows: results by tags 73, results by image 74, results by text 75 and results by VCL 76.

The terms, "for example", "e.g.", "optionally", as used herein, are intended to be used to introduce non-limiting examples. While certain references are made to certain example system components or similarity aspects, other components and similarity aspects can be used as well and/or the example components can be combined into fewer components and/or divided into further components.

All the above description and examples have been given for the purpose of illustration and are not intended to limit the invention in any way. Many different mechanisms and methods of providing similarity aspects can be employed, all without exceeding the scope of the invention.

The invention claimed is:

1. A method of searching for a similarity between digital visual objects, comprising:
   a) receiving an image of a digital visual object to be examined;
   b) applying similarity search on the received image by conducting several independent search queries, each query examining a different aspect of similarity, wherein the similarity aspects are one or more of the following: automated tags similarity that enables to derive insight from images by using machine learning model(s), image/pixel similarity that uses Artificial Intelligence (AI) to find visual similarities between images, text similarity that applies algorithms that return a degree of similarity between two text strings, and manual tags similarity that enables to manually classify the digital visual object with desired tags;
c) extracting from at least one database stored images of digital visual objects according to said applied similarity search;
d) ordering the extracted images according to each similarity aspect; and
e) displaying the ordered images of each aspect in a different section.

2. A method according to claim 1, wherein the automated tags similarity relates to digital visual objects that have similar main features.

3. A method according to claim 1, wherein the image/pixel similarity is configured for catching structural similarities of the digital visual objects.

4. A method according to claim 1, wherein the text similarity is configured to order images by the similarity of the text they may contain, to the text in the received image.

5. A method according to claim 1, wherein the manual tags similarity is configured to allow a user to manually classify a digital image of a visual object with desired tags.

6. A method according to claim 1, wherein the digital visual objects are images of trademarks.

7. A system of searching for a similarity between digital visual objects, comprising:
a) at least one processor; and
b) a memory comprising computer-readable instructions which when executed by the at least one processor causes the processor to execute similarity search engine, wherein the similarity search engine:
I. receives an image of a digital visual object to be examined;
II. applies similarity search on the received image by conducting several independent search queries, each query examining a different aspect of similarity, wherein the similarity aspects are: automated tags similarity that enables to derive insight from images by using machine learning model(s), image/pixel similarity that uses Artificial Intelligence (AI) to find visual similarities between images, text similarity that applies algorithms that return a degree of similarity between two text strings, and manual tags similarity that enables to manually classify the digital visual object with desired tags;
III. extracts from at least one database stored images of digital visual objects according to said applied similarity search;
IV. orders the extracted images according to each similarity aspect; and
V. displays the ordered images of each aspect in a different section.

8. A non-transitory computer-readable medium comprising instructions which when executed by at least one processor causes the processor to perform the method of claim 1.

* * * * *